United States Patent [19]

Olsen

[11] Patent Number: 5,054,829

[45] Date of Patent: Oct. 8, 1991

[54] WIRE PLACING DEVICE

[76] Inventor: Peter F. Olsen, 2105 Lorraine Pl., Carrollton, Tex. 75006

[21] Appl. No.: 523,033

[22] Filed: May 14, 1990

[51] Int. Cl.⁵ .............................................. B25J 1/04
[52] U.S. Cl. ..................................... 294/19.1; 294/24
[58] Field of Search ........................... 294/19.1, 22-24, 294/26; 114/221 R, 230; 119/151, 152; 140/2, 123; 254/134.3 R, 134.3 PA, 134.3 CL, 134.7

[56] References Cited

U.S. PATENT DOCUMENTS

| | | | |
|---|---|---|---|
| 103,627 | 5/1870 | Lamb | 294/24 |
| 2,688,510 | 9/1954 | Heyser | 294/19.1 |
| 2,700,252 | 1/1955 | Paganelli | 294/19.1 X |
| 3,072,429 | 1/1963 | Stipan | 294/19.1 |
| 3,733,097 | 5/1973 | Hank | 294/19.1 |
| 3,774,953 | 11/1973 | Babcock | 294/19.1 |
| 3,813,122 | 5/1974 | Wemyss | 294/19.1 |
| 3,856,340 | 12/1974 | Faulkner | 294/19.1 |
| 3,936,088 | 2/1976 | Williams | 294/19.1 |
| 4,230,357 | 10/1980 | Bosch et al. | 294/19.1 |
| 4,469,361 | 9/1984 | Pendergraft | 294/19.1 |
| 4,514,004 | 4/1985 | Morgan | 294/19.1 |
| 4,895,407 | 1/1990 | Mozer | 294/19.1 |

FOREIGN PATENT DOCUMENTS 2371800 7/1978 France ............................. 294/19.1

Primary Examiner—Johnny D. Cherry

[57] ABSTRACT

A device for placing wire over a series of open ceiling joists or other objects. The device comprises a rod for mounting on a pole. The rod has a support for a releasable disk. Wire is attached to the disk through a wire connecting hole. The disk is slid over the tip of the rod, through the disk sleeved hole and the disk is positioned on and supported by the base. The pole, with the rod mounted thereon and the disk with the wire mounted thereto, is raised above a ceiling joist or other elevated object. An upward thrust of the pole causes the disk to slide up and off the outward arm and over the object upon which the wire is to be installed over. The disk is of sufficient weight to cause it to descend to floor level, pulling the attached wire with it. Should the disk fail to descend due to wire snagging or some other reason, the pole is raised, positioning the trap over the suspended disk. The disk is trapped between the rods elongate arm and the inner arm and pulled down.

3 Claims, 2 Drawing Sheets

WIRE PLACING DEVICE

SUMMARY OF INVENTION

The principal object of the present invention is to provide a device for the installation of low voltage wire or cable over open ceiling joists and other elevated objects.

Another object is to provide a device that will enable one man to accomplish the task while standing at floor level.

It is also an object of the present invention to provide a safer way to accomplish the installation that is presently employed by eliminating the use of scaffolding and by eliminating or greatly reducing the use of extension ladders.

A further object is to provide a light weight device which is simple to operate and is of inexpensive construction.

BACKGROUND OF INVENTION

1. Field of Invention

The present invention relates to the installation of low voltage wire over ceiling joists and other elevated objects typically found, but not limited to, warehouses and factories.

2. Prior Art

Presently, people that install low voltage wire over ceiling joists and other elevated objects, perform that installation by using extension ladders or rolling scaffolding. While the present method accomplishes the task, it is labor extensive and therefore expensive. In most cases two installers are required to set up and move scaffolding and extension ladders as each ceiling joist is passed over with the wire. Using the present method injuries occur from falls, from assembling and disassembling scaffolding and from moving extension ladders. My invention, attached to a pole, allows one man, working at floor level, to install the wire over joists without the danger of injury described above, in a very time effective manner.

Various devices are known in the art for the remote manipulation of wire. For example, U.S. Pat. No. 4,514,004 is used to grasp wire and push or pull it through crawl spaces. This device cannot be used for installing wire over a series of joists by a person working at floor level. U.S. Pat. No. 4,230,357 manipulates wire in situations when it is not desirable to touch the wire. The device can pick up the wire and move it, but the design of the tool does not allow it to be effective when installing wire over elevated objects. There are devices that look similar to my invention such as U.S. Pat. No. 103,627, that is used to install picture hooks. I believe it will be obvious to the reader that the spur on that device would prevent access of the device between close parallel conduits, pipes or other objects thus severely inhibiting the use of the tool. While the disk could be elevated by using U.S. Pat. No. 3,936,088, the upwardly curving hook is not curved sufficiently to hold the disk at the required angle to allow the disk, with wire attached, to pass over the elevated object without prematurely falling off. The invention that installs cable on the cross arm of a pole, French Pat. No. 2,371,800 requires the open end of a cross arm for installation. Ceiling joists do not have open ends, therefore the device would not be of use in installing wire over ceiling joists. Many rope drops have been invented that could substitute wire for rope. Faulkners' U.S. Pat. No. 3,856,340 requires a length of rope to be wound around a spool. In the time required to wind the wire around the spool, several objects could be passed over using my device. The device could not be used in any case because the free falling spool would create a hazard when used in populated areas such as factories. The descent of the disk used with my wire placing device is at all times controlled by the operator. U.S. Pat. Nos. 3,813,122, 4,895,407, 2,700,252, 3,072,429, 3,774,953, require the object to be passed over to fit between the arms of the tools. Elevated objects such as air ducts would require a tool of massive proportions thus rendering it unsuitable for the task that my invention accomplishes. Heysers' invention, U.S. Pat. No. 2,688,510, while effective for placing rope over a tree limb, is not practical for placing wire over a series of objects typically found in factories and warehouses. The head of the invention, on its pipelike element, must pass laterally over the objects. Therefore the length of the tool must be in excess of the diameter of the object, or series of objects in close proximity of each other thereby requiring a tool of such a size as to render it impractical. The size of objects passed over with my invention is only limited by the length of the pole and the angle in which it is elevated. U.S. Pat. No. 4,469,361, is used to retrieve a lost stand of pipe. The hook is manipulated around the pipe or object, the handle is caused to separate from the hook and the hook remains on the object, allowing the operator to pull the object. The rope used does not pass from one side of the object, to be retrieved by the operator, therefore the tool can not be used to install wire over ceiling joists or other elevated objects. U.S. Pat. No. 3,733,097, is a device that attaches a hook to a remote object. While it could be used to place a hook on a ceiling joist, it could not be used to install wire over the ceiling joist.

BRIEF DESCRIPTION OF THE DRAWINGS

Figure one is a view of a rod constructed in accordance with the invention.

Figure two is a view of a disk constructed in accordance with the invention.

Figure 1:
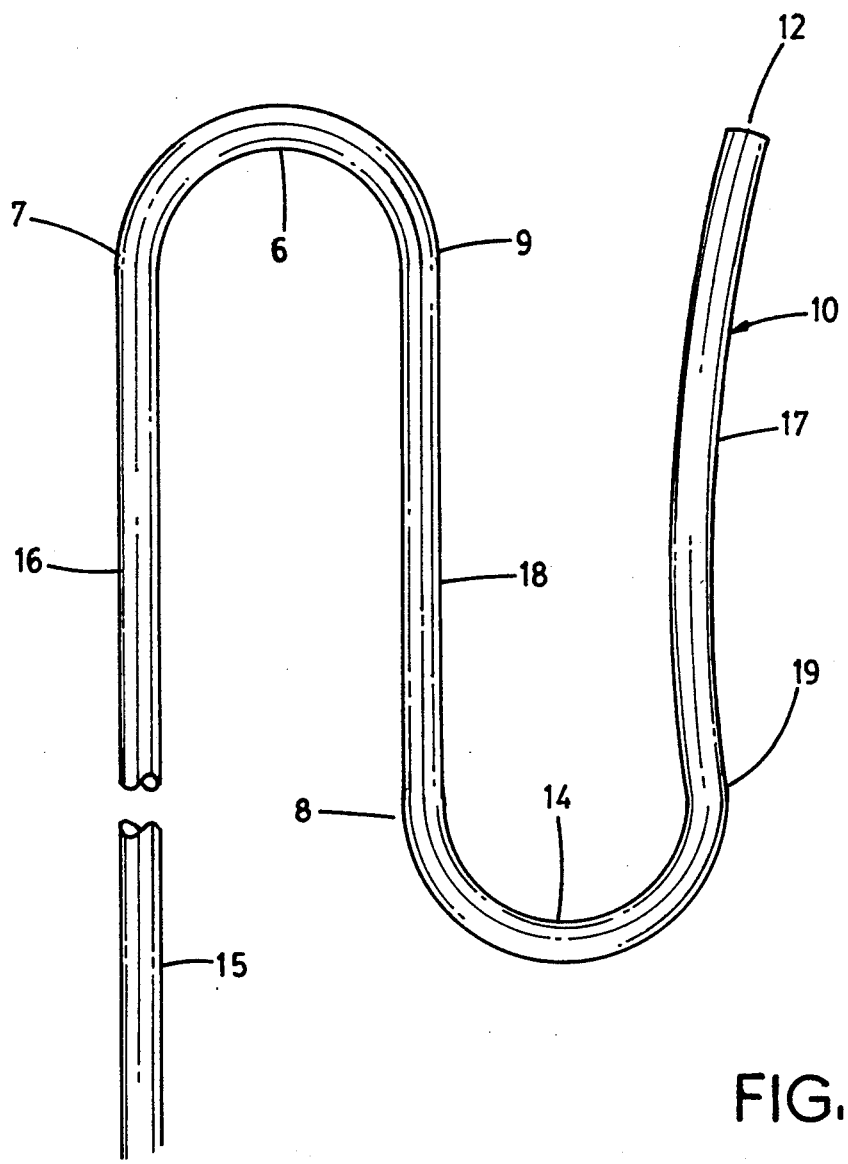
Figure 2:
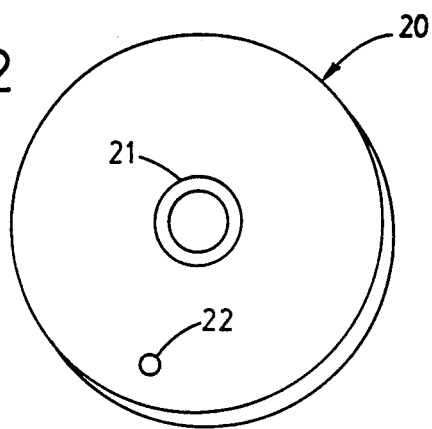
Figure 3:
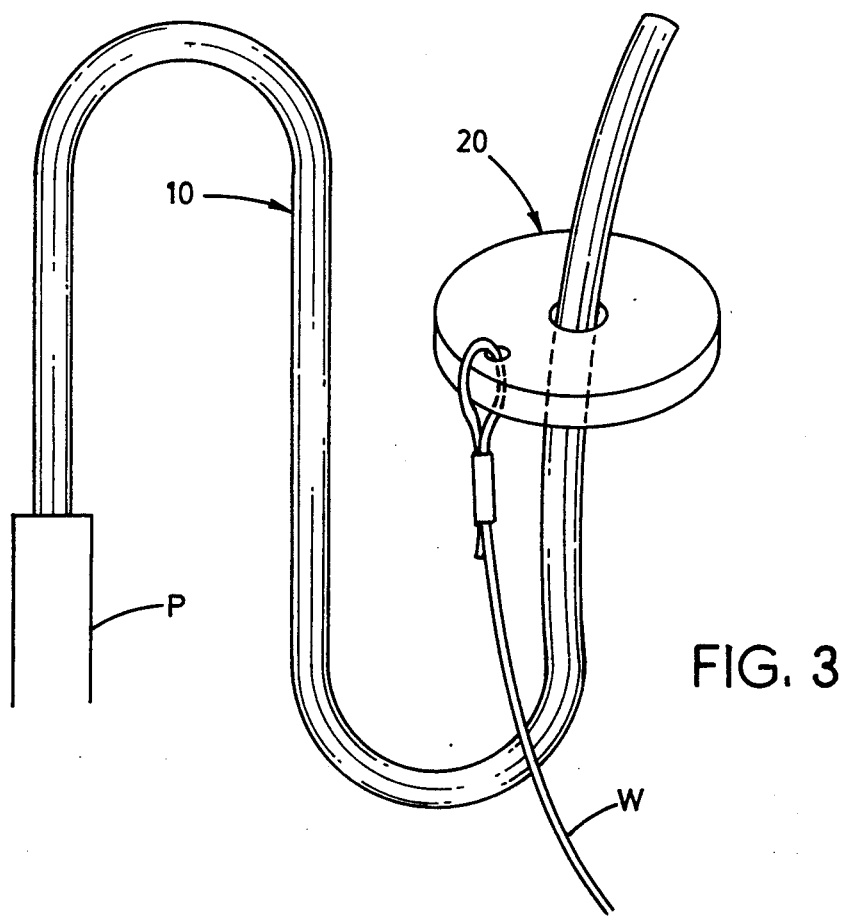

Figure three is a view of a disk being positioned on a rod, constructed in accordance with the invention.

DETAILED DESCRIPTION OF THE PREFERRED EMBODIMENT

The reference numeral (10) has been applied generally to the device comprising the rod of the present invention. The reference numeral (20) has been applied generally to the device comprising the disk of the present invention. As seen in the several views, my wire placing device comprises a rod (10) and a disk (20).

With reference to Figure One, a preferred embodiment of a wire placing device constructed in accordance with the invention, comprises a rod (10), a rod tip (12), an outward arm (17), a base (14), an inner arm (18), a trap (6), an elongate arm (16) and an end (15). The rod (10) may be fabricated from any suitable rigid material such as metal or plastic. The outward arm (17) meets point (19) of base (14) and the inner arm (18) meets point (8) of base (14), said base (14) serves to releasably support a disk (20). The inner arm (18) meeting at point (9) of trap (6) and the elongate arm (16) meeting at point (7) of trap (6) define the disk (20) trapping and retrieval means.

The distal end (15) of the elongate arm (16) of the rod (10) is adapted to be secured to the end of a pole with which a wire installer can reach above an open ceiling joist or other elevated object. In the embodiment of Figure one, elongate arm (16) extends at its distal end (15) a predetermined length for attachment to a pole. The device can be attached in any number of ways which will occur to those of ordinary skill in the art. For example, end (15) of elongate arm (16) can be inserted into a hole in the end of the pole and glued in position. Alternatively, the distal end (15) can be clamped or lashed to the end of the pole.

With reference to Figure Two, a preferred embodiment of a wire placing device constructed in accordance with the invention, comprises a disk (20) which is a rounded flattened circular object and includes a sleeved hole (21) and a wire connecting hole (22). The disk (20) may be fabricated of any suitable material such as hard rubber or plastic. The sleeve of the sleeved hole (21) may be made of any suitable material such as metal, that will provide a smooth surface and will allow disk (20) to slide on and off the rod's, (10) outward arm (17).

With reference to Figure Three, a preferred embodiment of a wire placing device constructed in accordance with the invention, comprises a rod (10) attached to a pole (P). The disk (20) has wire (W) passed through the wire connecting hole (22) with the free end of said wire (W) brought back and taped to the supply side of said wire (W) thus forming a secured loop with tape being the means of attachment to the disk (20). Said disk (20) is shown on outer arm (17) before becoming positioned on base (14).

OPERATION

The rod (10) is attached to a pole of sufficient length that when raised, the rod (10) is positioned above the ceiling joist or other elevated object over which the wire is to be installed. Wire is attached to the disk (20) through the wire connecting hole (22) with tape or other suitable means. The sleeved hole (21) of the disk (20) is positioned over the rod tip (12) and slid down the outward arm (17) and positioned on the base (14). The pole is raised by the installer with one hand until the rod (10) passes over the ceiling joist or other elevated object. While lightly holding the wire with his other hand, he releases the disk (20) from the rod (10) by thrusting the pole upward. The disk (20) slides up the outward arm (17), over the rod tip (12) and descends to floor level, pulling the wire with it. The rate of the disk's (20) descent is controlled by the installer feeding the wire through his hand. The disk (20) is retrieved and wire, of a length equaling the distance to the next object to be passed over, is pulled to that location. The disk (20) is repositioned on the rod (10) and installation is continued. This is continued until the wire termination location is reached.

The wire weight is a consideration when using my wire placing device. After the disk (20), with wire attached, is released over the elevated object, it is the weight of the disk (20) that causes the disk (20), with attached wire, to descend. When installing multiple conductor cable or multiple wires, it may not be desirable to use a disk (20) of sufficient weight to cause their descent. In this instance, a wire pulling rope, known to the art, and of a weight less than the wire being installed, can be used. One end of a wire pulling rope is attached to the disk (20) through the wire connecting hole (22) in place of the wire. The other end of the wire pulling rope is attached to the wire, or wires, to be installed. The length of the wire pulling rope is such that with the installer holding the end with the wire attached, the other end, attached to the disk (20), can pass over the ceiling joist or other elevated object, and reach floor level. When the disk (20) with wire pulling rope attached is passed over the elevated object and descends to floor level, the installer pulls the wire pulling rope and the attached wire is pulled over the elevated object to that location.

Should the disk, after passing over the object over which the wire is to be installed, fail to descend to floor level, due to wire snagging or some other reason, the installer raises the pole and positions the trap (6) over the disk (20). The pole is pulled down by the installer and the disk (20) is trapped between the inner arm (18) and the elongate arm (16). The disk (20) is then pulled to floor level by the installer.

Although the description above contains many specificities, these should not be construed as limiting the scope of the invention but merely providing illustrations of some of the presently preferred embodiments of this invention. For example, the disk can have any suitable geometric shape such as spherical, rectangular, triangular, etc.; the method of attaching wire or a wire pulling rope to the disk could be accomplished with a clamp or a two piece disk that when joined could clamp the wire to it; the pole could, with the inner arm, form the rod's trap, thereby having a rod without an elongate arm. Thus, the scope of the invention should be determined by the appended claims and their legal equivalents, rather than by the examples given.

Thus the reader will see that the invention provides a simple, fast and highly reliable method of installing wire or cable in locations that presently require the use of rolling scaffolding or extension ladders. Not only will it enable one installer to accomplish what presently requires two, but it reduces the real time required to accomplish the task, not just a savings of man hours. By eliminating the use of scaffolding and eliminating, or greatly reducing, the use of extension ladders, injuries resulting from their use will be reduced or eliminated. I believe that my invention will provide a low cost way to greatly increase productivity in all fields that use low voltage wire installed over ceiling joists.

What is claimed:

1. A device adapted to be mounted on a pole and used for placing wire over a series of open ceiling joists or other elevated objects, said device comprising:

a disk, with a means of having wire attached thereto, a rod, shaped to define a trap for retrieval of said disk, a tip, a base, an outward arm, an inner arm, an elongate arm and an end, said base releasably supporting said disk, said rod mounted on the end of a pole, with said pole operated by a person at floor level, elevating said rod and said disk supported thereby, to a position above an object over which wire is to be installed, with said pole disposed on one side of said object and said rod disposed on the opposite side of said object, the free end of said wire extending from said disk downwardly on said one side of said object, whereby an upward thrust of said pole propels said disk, with said wire attached thereto, up and off said outward arm, whereby gravity causes said disk to descent to floor level on said opposite side of said object, thereby pulling said attached wire to floor level.

2. The device according to claim 1, wherein said outward arm extends downward a predetermined length, before curving upward, said upward curving defining said base that is a support means for said disk, said inner arm being an extension from said base, said inner arm extending upward and opposite said outward arm and extending a predetermined length before curving downward, said downward curving defining said trap which is a trapping and retrieving means for said disk, said elongate arm being an extension of said trap and extending downward and opposite said inner arm, said elongate arm extension being of a predetermined length and extending to said rod end, said rod end adapted to be mounted on said pole.

3. The device according to claim 1, wherein said disk is a rounded flattened circular structure and includes a sleeved hole, said sleeved hole being of sufficient diameter as to accommodate said outward arm therein, said sleeved hole providing a smooth surface as to allow said disk to slide up and off said outward arm when an upward thrust of said pole is executed, said wire attaching means including a wire connecting hole of sufficient diameter as to accommodate said wire or a wire pulling rope, with said wire or wire pulling rope passing through said wire connecting hole and attachable to said disk by suitable means, said disk being of predetermined weight sufficient as to cause said disk, with said wire or wire pulling rope attached, to descend to floor level after being released from said rod above said elevated object over which said wire is to be installed.

* * * * *